United States Patent [19]

Armstrong

[11] 4,356,725

[45] Nov. 2, 1982

[54] TESTING THE POWER OF A TURBOCHARGED INTERNAL COMBUSTION ENGINE

[75] Inventor: Lee R. Armstrong, Newtonville, Mass.

[73] Assignee: RCA Corporation, New York, N.Y.

[21] Appl. No.: 198,836

[22] Filed: Oct. 20, 1980

[51] Int. Cl.³ .......................................... G01M 15/00
[52] U.S. Cl. ..................................................... 73/118
[58] Field of Search ...................... 73/116, 118, 117.3

[56] References Cited

U.S. PATENT DOCUMENTS 4,046,003  9/1977  Armstrong et al. .................. 73/118
4,277,830  7/1981  Reid et al. ......................... 73/116 X Primary Examiner—Jerry W. Myracle
Attorney, Agent, or Firm—Samuel Cohen; Raymond E. Smiley

[57] ABSTRACT

The power producing potential of a turbocharged engine is determined by measuring the acceleration at time $T_1$ of the turbocharger at a given turbocharger speed as the engine is accelerated, and measuring the deceleration at time $T_2$ of the turbocharger, at the same turbocharger speed, as the engine is decelerated. The power is a constant $K_1$ times the acceleration figure minus the deceleration figure. A more accurate result is obtained by adding a constant $K_2$ times the engine speed at time $T_1$ minus the engine speed at time $T_2$.

2 Claims, 3 Drawing Figures

TESTING THE POWER OF A TURBOCHARGED INTERNAL COMBUSTION ENGINE

This invention relates to the testing of the power-producing potential of a turbocharger-equipped internal combustion engine without resorting to the use of a dynamometer.

The full-load, full-speed testing of internal combustion engines for indicated power, brake power and friction power can be accomplished by connecting the engine to a monitoring dynamometer capable of absorbing the full-load output of the engine and capable of driving the maximum frictional load of the engine while measuring speed and torque. Such dynamometers are very large, very expensive, and very inconvenient to use.

A much more economical and convenient apparatus for testing spark-ignition internal combustion engines under simulated full-load conditions is apparatus for operating the engine with all but one of n ignitions interrupted, where n may be greater than the number of cylinders, so that all cylinders are operated in sequence under full power conditions. The engine operates at full speed driving frictional and pumping loads, without danger of overspeeding and damaging the engine.

An economical and convenient brake power test of compression-ignition internal combustion engines under simulated full-load conditions is the acceleration burst test in which an engine initially operating at idle speed is suddenly given full throttle and caused to accelerate to a maximum governed speed. The inertia of the engine is the load on the engine, and the time taken to accelerate through a low speed to a high speed is a measure of the full-power output capability of the engine. This test is particularly useful for testing diesel engines and provides a somewhat less accurate indication of the condition of a spark-ignition engine equipped with a carburetor instead of fuel injectors.

It is increasingly common for diesel engines to be equipped with turbochargers for improved performance. A turbocharger includes a turbine driven by exhaust gases from the engine, and an air compressor driven by the turbine to compress ambient air supplied to the engine. The turbine and compressor are on a common shaft having a rotational speed representing a balance between the drive produced by exhaust gases in the turbine, and the load produced by the air compressor, and also friction in the turbine and the compressor.

While the acceleration burst test is useful for naturally-aspirated diesel engines, it is less than fully satisfactory for the increasingly popular turbocharged diesel engines because of turbocharger lag. During full throttle acceleration, the fuel injectors quickly supply a large quantity of fuel, while the turbocharger lags in supplying a commensurate quantity of air. The result is that, during acceleration, the engine is overfueled, and the acceleration is less than for a naturally-aspirated engine, so that the acceleration is no longer an accurate indicator of the power producing potential of the engine.

In accordance with an example of the present invention, the acceleration and deceleration of the turbocharger shaft during acceleration and deceleration of the engine is used to determine the power potential of the engine.

Figure 1:
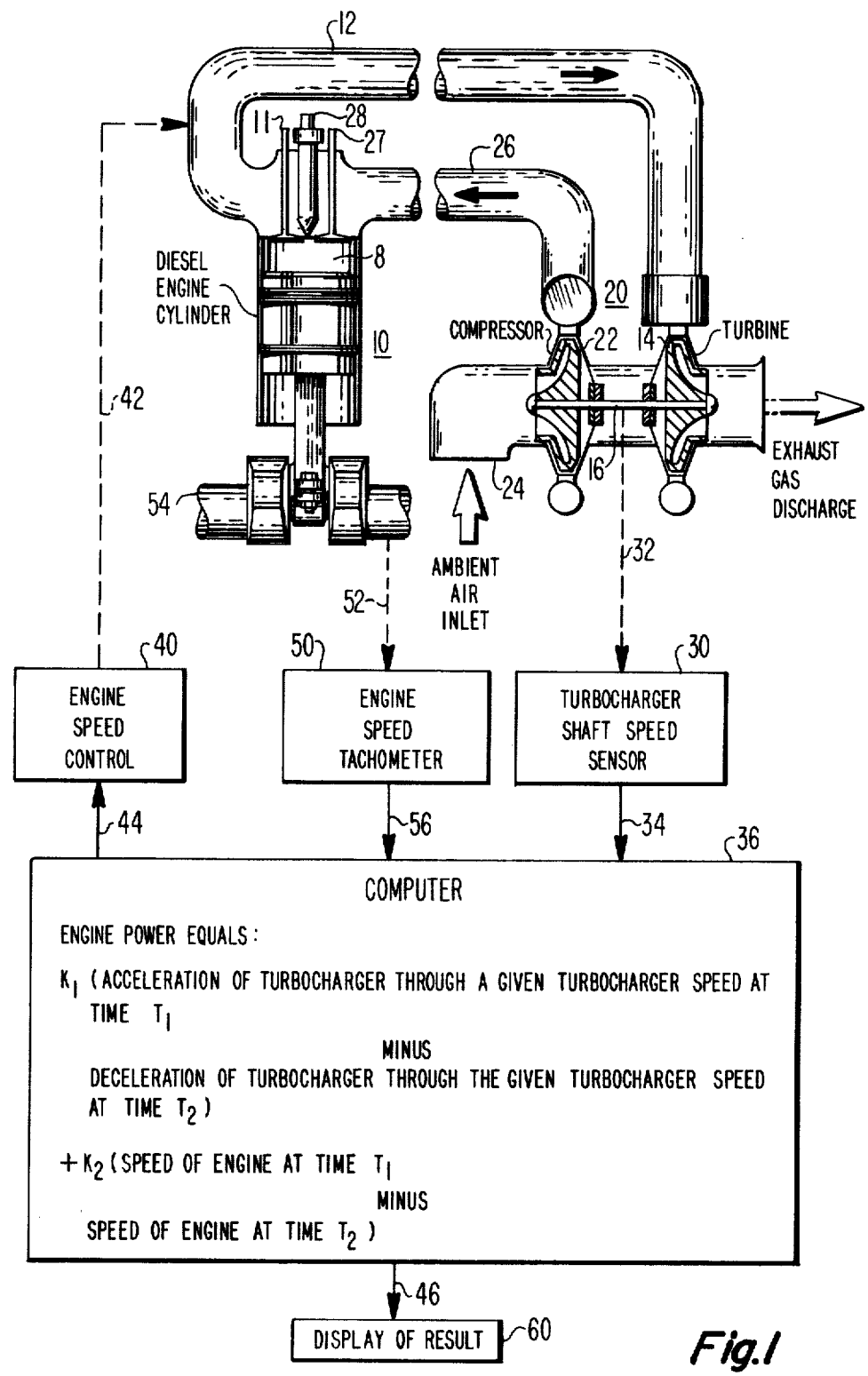
FIG. 1 is a diagram of a portion of a diesel engine with a turbocharger, and apparatus for determining the power producing potential of the diesel engine.

In FIG. 1, the exhaust gases from a cylinder 8 of a diesel engine 10 are conveyed past an exhaust valve 11 and via a pipe 12 to a turbine motor 14 on a shaft 16 in a turbocharger 20. Rotation of the turbine 14 by the exhaust gases acts through shaft 16 to drive air compressor 22. This causes ambient air at inlet 24 to be compressed and delivered via pipe 26 and through an inlet valve 27 to the interior of the cylinder 8. Diesel fuel is supplied to the cylinder via a fuel injector 28.

The test equipment by which the condition of diesel engine 10 is determined includes a turbocharger shaft speed sensor 30 having a mechanical linkage over path 32 with the shaft 16, and having a speed-indicating electrical signal output at 34. The shaft speed sensor 30 may be a tachometer mechanically connected to the shaft 16 if the shaft is externally accessible, or may include an electro-magnetic pick-up constructed in the turbocharger, or may include an electro-magnetic pick-up device positioned on the exterior of the turbine 14 or the compressor 22 to sense the movement of rotor blades therein. In any case, the electrical signal representing the rotational speed of shaft 16 is supplied over line 34 to a computer 36.

The speed of operation of the diesel engine 10 is controlled by an engine speed control unit 40 acting over a mechanical linkage 42 on the fuel injector 28. The unit 40 is controlled, in turn, by an electrical signal supplied over line 44 from computer 36.

The speed of operation of the diesel engine crankshaft in revolutions per minute is sensed by an engine speed tachometer 50 which may have a mechanical coupling 52 from the crankshaft 54 of the engine 10, or an electro-magnetic coupling from a rotating part such as the vibration damper of the engine. Any suitable tachometer may be employed to provide an electrical output over path 56 to the computer 36.

The computer 36, as will be described, operates through engine speed control unit 40 to accelerate and then decelerate the diesel engine 10, and during the acceleration and the deceleration of the engine, receives turbocharger shaft speed information from sensor 30, and engine speed information from engine tachometer 50. The computer analyses the received speed information and supplies an engine power signal over path 46 to a display device 60, which may be a cathode-ray-tube display unit. The display device, depending on the type employed, may display a number representing the power potential of the diesel engine, or simply the word "GOOD" or the word "BAD".

The diesel engine power test is based on an analysis of the acceleration and deceleration of the turbocharger shaft as the engine is accelerated and decelerated, rather than on any single shaft speed reading. Because the turbocharger speed tends to "float", to arrive at a balance between power produced by the turbine and power absorbed by the compressor and friction, steady-state speed measurements are of little value.

As can be seen in FIG. 1, the only interaction between the turbocharger and the engine is via the intake and exhaust gas flow. Power is generated in the turbine by the available energy in the exhaust gas. This power is then dissipated by compressing the inlet air, with some losses due to friction. Any power imbalance will result in corresponding acceleration (or deceleration) of the turbocharger, until an equilibrium is reached.

It can be shown from air cycle analysis that turbine power $P_T$ is proportional to engine power $P_E$. During a full-throttle acceleration of the engine from idle to high idle, the turbocharger will accelerate, and the turbocharger acceleration is then $$A_t = \frac{P_t - P_c - P_F}{N_T I}$$

where
$A_T$ = acceleration of turbocharger
$P_T$ = turbine power
$P_c$ = compressor power
$P_F$ = friction power
$N_T$ = turbocharger speed
$I$ = turbocharger inertia If we let subscript A represent values obtained during engine acceleration, and subscript D represent values obtained during engine deceleration, then $$A_{TA} - A_{TD} = \frac{P_{TA}}{N_{TA}I} - \frac{P_{CA}}{N_{TA}I} - \frac{P_{FA}}{N_{TA}I} - \frac{P_{TD}}{N_{TD}I} + \frac{P_{CD}}{N_{TD}I} + \frac{P_{FD}}{N_{TD}I}$$

If all values are measured at the same turbocharger speed ($N_{TA}=N_{TD}$), and $P_{FD}=P_{FC}$ and $N_T I$ ($A_{TA}-A_{TD}$)=$P_{TA}-P_{CA}-P_{TD}+P_{CD}$.

Assuming $P_{TD}$ is negligible during the deceleration, then $$N_T I(A_{TA}-A_{TD}) = P_{TA} - P_{CA} + P_{CD}$$

When the engine is operating for this test at speeds between a low idle and a high idle, the compressor pressure ratio is close to 1 and the mass flow can be approximated as a function of engine speed. The power of the compressor is determined by the inlet air conditions, mass flow of air, pressure ratio, and compressor efficiency. Inlet air conditions will not vary during the test, the pressure ratio is close to 1, and its variation is small enough at the points of interest to be considered constant. Over that portion of the compressor characteristics being used for the test, the cause of the major difference between $P_{CA}$ and $P_{CD}$ is mass flow, which can be approximated by measuring engine speed. Assuming compressor power then to be a constant times mass flow, and mass flow to be a function of engine speed ($N_E$), $$N_T I(A_{TA}-A_{TD}) = P_{TA} - K_2(N_{EA} - N_{ED})$$

$$P_{TA} = N_T I(A_{TA}-A_{TD}) + K_2(N_{EA} - N_{ED})$$

and since $P_{TA}$ is proportional to engine power ($P_E$), and $N_T I$ is a constant, $$P_E = K_1(A_{TA}-A_{TD}) + K_2(N_{EA} - N_{EO})$$

in which $A_{TA}$ and $A_{TD}$ were measured at the same time as $N_T$, and $N_E$ is measured at the same time as $A_T$. The constants $K_1$ and $K_2$ may be values such as 0.9 and 0.06, respectively.

The foregoing formula for engine power $P_E$ may be expressed in words as equal to $K_1$ times the quantity (acceleration of the turbocharger through a given turbocharger speed at time $T_1$, minus deceleration of the turbocharger through the same given speed at time $T_2$), plus $K_2$ times the quantity (speed of engine at time $T_1$, minus speed of engine at time $T_2$).

The second half of the formula, involving engine speeds, corrects for differences in the mass flow of air during the two turbocharger measurements. This correction is relatively small and may be omitted if a somewhat less accurate determination of engine power is acceptable.

Figure 2:
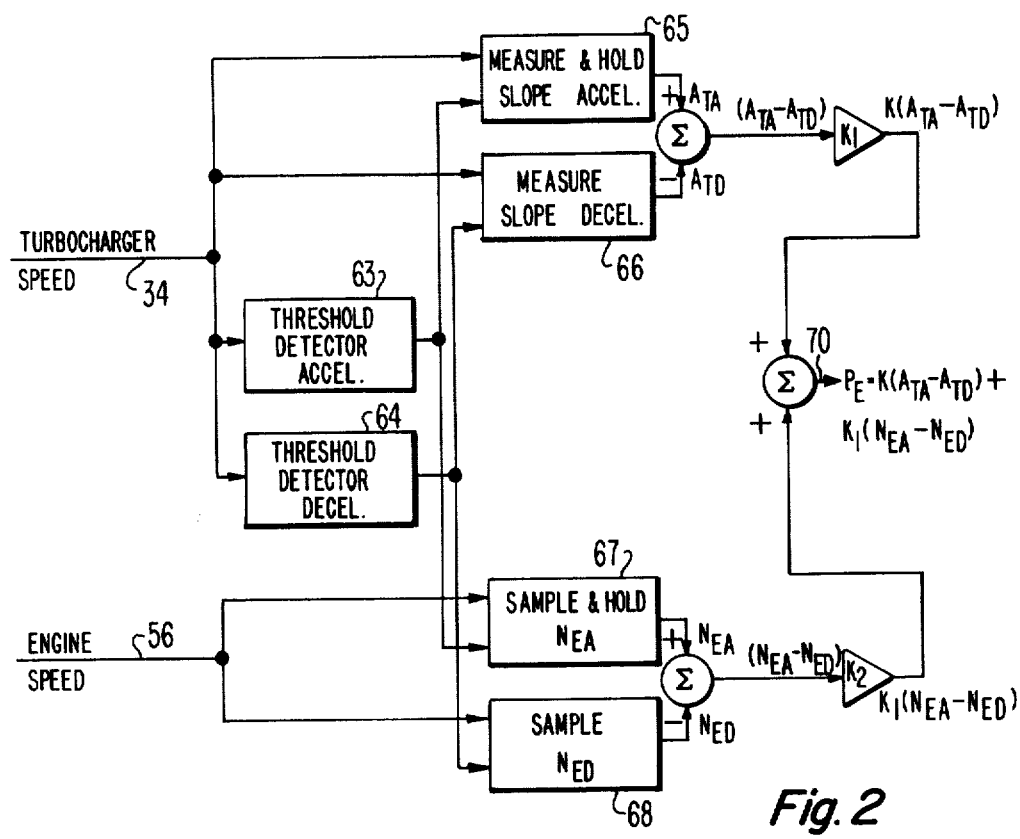
FIG. 2 is a diagram of apparatus which may be used in the box labeled "computer" in FIG. 1.

FIG. 2 shows an apparatus for solving the foregoing engine power equation. The apparatus can be configured using either analog or digital devices or a combination of analog or digital using standard state-of-the-art techniques and elements. Turbocharger speed at 34 can be obtained by any speed measuring means 30 in FIG. 1, and be either an analog or digital signal depending upon the devices used. A laser has been used to produce a signal of one pulse per turbocharger revolution, and a clock/counter circuit has been used to obtain a digital speed measurement in the interval between pulses. Engine speed at 56 can be obtained by any convenient means 50 in FIG. 1. All turbocharger and engine measurements are made at one value of turbocharger speed, once at $T_1$ while accelerating from idle to high idle under full-throttle, and once at $T_2$ while decelerating from high idle with the fuel shut off (closed throttle). A threshold detector 63 detects the turbocharger speed and compares it with the desired speed at which measurements are to be made. The detector 63 can utilize various reset and enable controls if desired, so that activation only occurs after certain pretest conditions have been met, such as verification that an acceleration from idle has begun. When the desired speed has been reached at time $T_1$, the threshold detector 60 enables the "measure and hold slope" circuits 65 and the engine speed "sample and hold" circuits 67. The turbocharger acceleration and engine speed are then saved for summing with the deceleration data. The engine continues to accelerate to its maximum no-load speed (high idle) at which time the operator closes the throttle, allowing the engine to decelerate back to idle speed. Threshold detector 64 samples the turbocharger speed, and when it returns to the same speed at which the previous measurements were made, enables the "measure slope" circuit 66, and the engine speed measurement circuit 68. As before, the threshold detector can use whatever degrees of sophistication desired to ensure that the test conditions are met. The turbocharger deceleration $A_{TD}$ from circuit 66 is subtracted from its acceleration $A_{TA}$ from circuit 65, and then multiplied by $K_1$, a constant which may be a figure such as 0.9. The engine speed at which the deceleration was measured ($N_{ED}$) at time $T_2$ is subtracted from the engine speed, $N_{EA}$ measured at time $T_1$, and then multiplied by the constant $K_2$. The sum at 70 of these two products, $K_1$ ($A_{TA}-A_{TD}$) and $K_2$ ($N_{EA}-N_{ED}$) is the desired result, $P_E$, which is proportional to the engine's power. If desired, $P_E$ can be further scaled to result in a numerically identical number to the horsepower which would be obtained if the engine were tested on a dynamometer.

A Cummins VT-903 diesel engine was tested in a normal or baseline condition, with faults, and at various operating temperatures. The steady-state power for each fault was measured with the dynamometer, attached to the engine. Three types of faults were introduced: (1) a recalibration of the fuel pump to reduce power; (2) a leak in the intake manifold (also simulates poor turbocharger efficiency); and (3) a restricted air inlet. The normal, no-fault, condition was tested with the engine in several different temperature conditions—immediately after a cold startup, while warm, and while hot—to determine operating temperature sensitivity.

Figure 3:
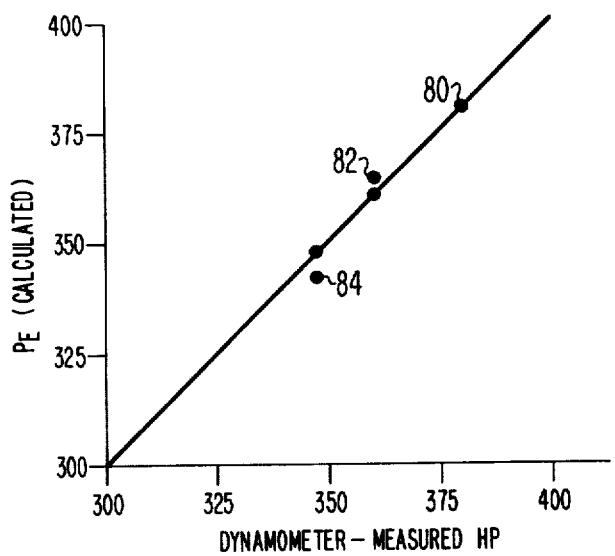
FIG. 3 is a chart showing the results of power tests on an actual diesel engine.

Using $P_E = K_1(A_{TA} - A_{TD}) + K_2(N_{EA} - N_{ED})$ for the data available, the constants were empirically determined as $K_1 = +0.9$ and $K_2 = -0.06$. Applying these, a linear relationship between $P_E$ and actual steady-state engine power was verified. Adjustment of the slope to arrive at a numerically correct power value provided the results shown in FIG. 3. As FIG. 3 shows, engine power $P_E$ calculated using the above formula is remarkably close to the engine power measured by a dynamometer. Point 80 in FIG. 3 indicates the power measurement on an engine without any fault, and points 82 and 84 indicated measurements on the engine faults 1 and 2 listed above. The only significant error was at 285 HP (not shown) where the fault was a severely restricted air inlet.

The described power test of an engine provides a useful measure of engine power by means which is very quick and inexpensive compared with the use of a dynamometer.

What is claimed is:

1. The method of determining the power-producing potential of a turbocharged diesel engine, comprising the steps of:

burst accelerating the engine from a low idle speed to a high idle speed, and allowing the engine to decelerate to the low idle speed, sensing the turbocharger shaft speed during said acceleration and deceleration, determining the turbocharger acceleration $A_{TA}$ at a given turbocharger speed, determining the turbocharger deceleration $A_{TD}$ at said given speed, and determining the engine power using the formula:

$$P_E = K(A_{TA} - A_{TD}),$$

where K is an empirically-determined constant such as 0.9.

2. The method of determining the power-producing potential of a turbocharged diesel engine, comprising the steps of:

burst accelerating the engine from a low idle speed to a high idle speed, and allowing the engine to decelerate to the low idle speed, sensing the turbocharger shaft speed and the engine speed during said acceleration and deceleration, determining the turbocharger acceleration $A_{TA}$ at a given turbocharger speed, determining the turbocharger deceleration $A_{TD}$ at said given speed, recording the engine speed $N_{EA}$ when the turbocharger is accelerating through said given turbocharger speed, recording the engine speed $N_{ED}$ when the turbocharger is decelerating through said given turbocharger speed, and determining the engine power using the formula:

$$P_E = K_1(A_{TA} - A_{TD}) + K_2(N_{EA} - N_{ED}),$$

where $K_1$ and $K_2$ are empirically-determined constants such as 0.9 and 0.06, respectively.

* * * * *